United States Patent Office 3,338,799
Patented Aug. 29, 1967

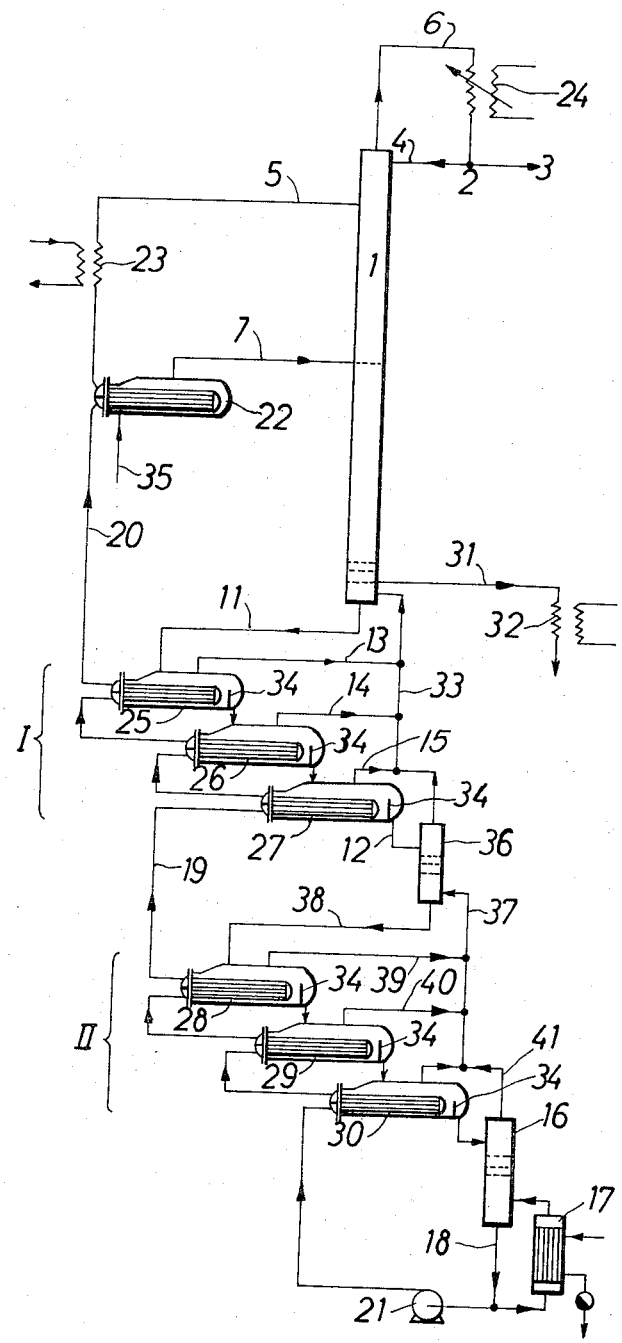

3,338,799
EXTRACTIVE DISTILLATION IN COMBINATION WITH MULTI-STAGE EVAPORATION
Hans-Walther Brandt, Cologne-Flittard, Feliks Bitners, Leverkusen, and Erich Meier, Cologne-Deutz, Germany, assignors to Farbenfabriken Bayer Aktiengesellschaft, Leverkusen, Germany, a German corporation
Filed Nov. 29, 1963, Ser. No. 326,825
Claims priority, application Germany, Dec. 1, 1962, F 38,440
6 Claims. (Cl. 203—23)

ABSTRACT OF THE DISCLOSURE

Extractive distillation of less difficultly volatile and more difficultly volatile components with a high boiling added component, in which the sump product of added component and more difficultly volatile components is subjected to multi-stage evaporation and auxiliary distillation, with return of vaporized sump product to the sump and with return of liquid sump product to the extractive distillation after such liquid sump product has been reheated and passed in indirect heat exchange with the sump product being subjected to the multi-stage evaporation and auxiliary distillation, such that the entire heat for the system is supplied in the last auxiliary distillation step.

---

The present invention relates to a process for saving heat in connection with extractive distillation, in which the heat contained in the sump discharge is recovered by way of heat exchangers. The invention is used more especially in those cases where the components to be separated are sensitive to temperature.

The object of an extractive distillation is to increase the separation factors of a mixture of components by adding another component. The boiling point of the added component should generally be so high that an azeotrope is not formed with one of the components of the mixture to be separated. The added component causes, in the liquid phase of the mixture to be separated, a change to a varying extent of the activity coefficients of the individual components of the mixture. This change is concomitantly greater as the concentration of the added component in the total mixture is increased.

Normally, with an extractive distillation, the mixture to be separated is run in at a suitable point in the column and the added component is supplied in liquid phase to the column a few plates below the top of the column. As a result, the effect achieved in most cases is that the product at the top of the column is formed without any added component. In order to obtain a constant liquid concentration of the added component throughout the entire column, the mixture to be separated must be supplied in vapour form. If the influx of the mixture to be separated is in liquid form, some of the added component must be supplied to the column together with the mixture to be separated while the remainder of the added component is introduced a few plates below the top of the column.

The extractive distillation proceeds substantially isothermally. The rise in temperature in such a column from the top to the sump corresponds substantially only to the rise in pressure which is produced by the pressure loss of the individual plates. Those components which are more readily volatile in the mixture to be separated are drawn off at the top of the column and a mixture of the less volatile components of the mixture to be separated and the added component is obtained in the sump. The vapour which is produced in the sump evaporator and which ascends in the column consists mainly of the less volatile constituents of the components to be separated, when the added component is of high boiling point. As a result, there is produced an increase in the concentration of the added component in the sump evaporator and in the plates disposed thereabove and, combined therewith, a usually strong increase in the sump temperature, which can easily lead to partial decomposition or polymerisation or the like of the more difficultly volatile component. Should the more difficultly volatile constituents of the mixture to be separated no longer be present in the sump discharge, and should the sump discharge of the column therefore consist of the pure added component, the column sump temperature corresponds to the boiling temperature of the added component at the corresponding sump pressure. In the case in which the sump discharge constitutes the pure added component, the less volatile components of the mixture to be separated can be extracted in vapour form a few plates above the column sump.

As already indicated above, the increase in the separation factors between the individual components of the mixture to be separated is concomitantly greater as the concentration of the added component in the liquid stream of the column becomes greater. In most cases, this concentration is more than 50%. The upper limit of this concentration is provided by the large quantities of liquid with relatively small quantities of vapour which have to flow in counter-current through the column. With favourable design of the rectifier column, the concentration of the added component can however amount to more than 70%.

In the sump evaporator of the column, relatively large heat quantities must be supplied on account of the great rise in temperature of quantities of liquid being treated. Thus, the heat quantity which serves for heating the added component can be considerably greater than the heat quantity which is required for the production of pure vapour. In addition, on account of the large quantities of circulating added component, this must be conducted in a cycle. Connected therewith is a re-cooling of the added component to the column influx temperature, which corresponds approximately to the temperature at the head of the column when the added component is supplied at the head.

In order now to be able to save the considerable heat quantities which serve for separating the more difficultly volatile components of the mixture to be separated from the added component and which are not used in the true sense for the rectifying action, while subjecting the more difficultly volatile components to smallest possible temperature stressing, it is proposed according to the invention that some of the stream discharging at the base of the column should be directly evaporated and heated in several steps.

One embodiment of an arrangement for carrying the process into effect is shown in the drawing.

The mixture to be separated is supplied in vapour form through a pipe 7 to a suitable distillation column 1, while the added component is supplied to the column 1 through a pipe 5. The top product taken off via line 6 and condensed in the top or head condenser 24 is divided at 2 into a distillate discharge 3 and a column return 4. From the top to the sump of the main distillation column 1, the concentration of the added component in the liquid phase remains practically constant. Through a pipe 11, the liquid stream leaves the main distillation column 1 with a relatively low temperature. With extractive distillation, this temperature is higher than the temperature of the head of the column, by substantially only the amount which corresponds to the pressure rise in the column owing to the pressure losses of the separate plates.

This liquid stream in the pipe 11 is now delivered to a row of series-connected evaporators 25, 26 and 27. These evaporators are heated by means of the added component which comes from sump discharge 18 via return line 19 and which has been cooled to a certain degree in evaporator group 28, 29 and 30. In the evaporators 25, 26 and 27, there is mainly evaporated a part of those difficultly volatile constituents of the mixture to be separated which are dissolved in the added component, as well as small quantities of the added component. A plurality of evaporators 25, 26 and 27 are connected in series in order thus to obtain a concentration gradient and a boiling temperature gradient. Thus, the thermal stressing of the difficultly volatile components of the mixture to be separated, which are removed in vapour form through a pipe 31 and deposited in a condenser 32, is quite considerably reduced and in fact to a low level such as is not obtained in any prior known heat-saving arrangement, because the concentration of the difficultly volatile components is already very small in the last evaporator 27 of the arrangement and the residence time therein is quite short. The quantities of vapour being formed in the individual evaporators 25, 26 and 27 are conducted through the pipes 13, 14 and 15 and together through the pipe 33 into the main distillation column 1, beneath the bottom plate thereof. The liquid level in the evaporators 25–30 is kept constant by means of discharge weirs 34. In each case, the overflow runs to the next evaporator. This makes it possible to dispense with any pumps and control devices which are normally necessary with similar methods. The liquid discharge 12 of the last evaporator 27 of the first evaporator group runs as return flow to a short column section 36, which generally has two to three plates. In this column section 36, there is produced a certain increase in the concentration of the added component in the discharging stream of liquid. Some of the vapour supplied to this column through the pipe 37 comes by way of the pipes 38, 39 and 40 from the next evaporator group 28, 29 and 30, in which there is a further increase in concentration of the discharging liquid in the same way as described in respect of the evaporator group 25, 26 and 27. The other part of the vapour supplied to the column section 36 comes from the column section 16 through the pipe 41. Any desired number of new evaporator groups can be provided, depending on the temperature difference between the sump discharge 11 of the main distillation column 1 and the sump discharge 18 of the last column section 16. In the present drawing, two such evaporator groups 25–27 and 28–30 are shown. The column section 16 following after the last evaporator group 28, 29 and 30 obtains its vapour from a vapour-heated sump evaporator 17. The heat quantity supplied here corresponds substantially to that which is necessary for producing the vapour flowing in the column 1 plus the difference of the enthalpies of the liquid streams at 11 and 20. By means of the pump 21, the discharging added component is forced via return line 19 successively through the evaporator groups 28–30 and 25–27 or, when other stages are provided, through each additional evaporator group. In most cases, the heat quantity still present in the sump discharge after leaving the last heat exchanger 25 is sufficient to evaporate the mixture influx 35 in the exchanger 22. A subsequent re-cooling of the pure added component, which represents the sump product 18, to influx temperature is effected in a normal condenser 23 with heat being given off to a coolant.

We claim:

1. Process for the extractive distillation of a component mixture which comprises introducing into a main distillation zone having a head and a sump a preheated substantially vapor phase starting mixture of substantially less difficultly volatile and more difficultly volatile components at a first point intermediate said head and sump and a liquid phase substantially high boiling added component at a second point above said first point for carrying out said extractive distillation, recovering substantially said less difficultly volatile components from said head and substantially said more difficultly volatile components at a third point just above said sump and substantially below said first and second points, removing from said sump liquid phase sump mixture including substantially said added component and attendant more difficultly volatile components, passing said sump mixture in series flow through a plurality of series evaporation zones each followed by a corresponding auxiliary distillation zone having an auxiliary sump, such that in each series evaporation zone quantities substantially of more difficultly volatile components are vaporized from said sump mixture and in each following corresponding auxiliary distillation zone further quantities substantially of more difficultly volatile components are vaporized therefrom, with the sump product in the last auxiliary distillation zone being composed essentially of added component, passing vaporized quantities substantially of more difficultly volatile components from each subsequent series evaporation zone and following corresponding auxiliary zone back to the sump of the next preceding auxiliary zone and passing vaporized quantities substantially of more difficultly volatile components from the first series evaporation zone and following corresponding auxiliary zone back to the sump of said main distillation zone, and supplying the entire heat for the system to the sump of said last auxiliary zone and recycling the so-heated added component from the sump of said last auxiliary zone back to said second point of introduction into the main distillation zone after passage in indirect heat exchange first with each of said series evaporation zones from the last to the first, respectively, and thereafter with the starting mixture prior to introduction of such starting mixture into the main distillation zone, whereby the so-heated added component provides the necessary heat for vaporizing the more difficultly volatile components being passed back to the sump of said main distillation zone, for preheating the starting mixture introduced into said main distillation zone, and for carrying out the extractive distillation in said main distillation zone.

2. Process according to claim 1 wherein said starting mixture before preheating by said indirect heat exchange is in liquid phase and after said preheating is converted to vapor phase and introduced at said first point in said vapor phase.

3. Process according to claim 1 wherein a portion of said recycled added component is premixed with said starting mixture and introduced therewith at said first point, the remainder of said recycled added component being introduced at said second point.

4. Process according to claim 1 wherein said added component is present in said main distillation zone in a concentration of more than 50% based on the liquid stream therein.

5. Process for the extractive distillation of a component mixture which comprises introducing into a main distillation zone having a head and a sump a preheated substantially vapor phase starting mixture of substantially less difficultly volatile and more difficultly volatile components at a first point intermediate said head and sump and a liquid phase substantially high boiling added component at a second point above said first point for carrying out said extractive distillation, recovering substantially said less difficultly volatile components from said head and substantially said more difficultly volatile components at a third point just above said sump and substantially below said first and second points, removing from said sump liquid phase sump mixture including substantially said added component and attendant more difficultly volatile components, passing said sump mixture to a first series evaporation zone to vaporize quantities substantially of more difficultly volatile components therefrom, then passing said sump mixture from said first evaporation zone to a first auxiliary distillation zone having a sump to vaporize further quantities substantially of more difficultly volatile components therefrom, thereafter passing said sump mixture from said first auxiliary zone to a second series evaporation zone to vaporize still further quantities substantially of more difficultly volatile components therefrom, and finally passing said sump mixture from said second evaporation zone to a second auxiliary distillation zone having a sump to vaporize final quantities substantially of more difficultly volatile components therefrom and to provide a sump product in said second auxiliary zone composed essentially of added component, passing vaporized quantities substantially of more difficultly volatile components from said second auxiliary zone and from said second series zone back to the sump of said first auxiliary zone, passing vaporized quantities substantially of more difficultly volatile components from said first auxiliary zone and from said first series zone back to the sump of said main distillation zone, supplying the entire heat for the system to the sump of said second auxiliary zone and recycling the so-heated added component from the sump of said second auxiliary zone back to said second point of introduction into the main distillation zone after passage in indirect heat exchange first with the liquid phase sump mixture in said second series zone, then with the liquid phase sump mixture in said first series zone, and thereafter with the starting mixture to preheat and thereby vaporize such starting mixture prior to introduction thereof into the main distillation zone, whereby the so-heated added component provides all the necessary heat for vaporizing the more difficultly volatile components being passed back to the sump of said main distillation zone, for vaporizing the starting mixture introduced into said main distillation zone, and for carrying out the extractive distillation in said main distillation zone.

6. Process according to claim 5 wherein said added component is present in said main distillation zone in a concentration of more than 50% based on the liquid stream therein, wherein said starting mixture contains components to be separated which are sensitive to temperature, wherein said added component has a boiling point in excess of that required to form an azeotrope with any component of said starting mixture, wherein the extractive distillation is carried out substantially isothermally, and wherein the increase in temperature between said head and sump in said main distillation zone corresponds substantially to the resultant pressure loss therewithin.

References Cited

UNITED STATES PATENTS

| | | | |
|---|---|---|---|
| 335,427 | 2/1886 | Clapp | 202—155 |
| 478,132 | 7/1892 | Rowland | 202—155 |
| 837,696 | 12/1906 | Lorentz | 202—155 |
| 1,100,834 | 6/1914 | Lindsey | 202—155 |
| 1,196,832 | 8/1914 | Obrador | 202—155 |
| 1,548,824 | 8/1925 | Condict | 202—155 |
| 2,509,136 | 5/1950 | Cornell | 202—154 |
| 2,828,249 | 3/1958 | Maze-Sencier et al. | 203—27 |
| 3,248,308 | 4/1966 | Haskell | 202—154 |

FOREIGN PATENTS 582,609  8/1933  Germany.

NORMAN YUDKOFF, *Primary Examiner.*

WILBUR L. BASCOMB, JR., *Examiner.*